(12) United States Patent
Miyama et al.

(10) Patent No.: US 10,668,917 B2
(45) Date of Patent: Jun. 2, 2020

(54) DRIVE SYSTEM AND DRIVE CONTROL METHOD

(71) Applicant: MITSUBISHI ELECTRIC CORPORATION, Chiyoda-ku (JP)

(72) Inventors: Yoshihiro Miyama, Chiyoda-ku (JP);
Masaki Yamada, Chiyoda-ku (JP);
Takeshi Mori, Chiyoda-ku (JP);
Shigeki Harada, Chiyoda-ku (JP);
Moriyuki Hazeyama, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 190 days.

(21) Appl. No.: 15/752,055

(22) PCT Filed: Aug. 19, 2016

(86) PCT No.: PCT/JP2016/074285
§ 371 (c)(1),
(2) Date: Feb. 12, 2018

(87) PCT Pub. No.: WO2017/073144
PCT Pub. Date: May 4, 2017

(65) Prior Publication Data
US 2018/0236999 A1    Aug. 23, 2018

(30) Foreign Application Priority Data
Oct. 27, 2015   (JP) .................................. 2015-210765

(51) Int. Cl.
*B60W 20/20*   (2016.01)
*B60W 10/08*   (2006.01)
(Continued)

(52) U.S. Cl.
CPC ............... *B60W 20/20* (2013.01); *B60K 6/26* (2013.01); *B60K 6/40* (2013.01); *B60K 6/442* (2013.01);
(Continued)

(58) Field of Classification Search
None
See application file for complete search history.

(56) References Cited

U.S. PATENT DOCUMENTS

2016/0009269 A1*   1/2016   Zhou ..................... B60W 10/08
701/22

FOREIGN PATENT DOCUMENTS

| EP | 2 965 942 A1 | 1/2016 |
| JP | 3-203501 A | 9/1991 |

(Continued)

OTHER PUBLICATIONS

International Search Report dated Nov. 1, 2016, in PCT/JP2016/074285 filed Aug. 19, 2016.
(Continued)

*Primary Examiner* — Lail A Kleinman
(74) *Attorney, Agent, or Firm* — Oblon, McClelland, Maier & Neustadt, L.L.P.

(57) ABSTRACT

In a drive system including a battery, a power generation device (PGD) including a generator mounted to an engine shaft, and a drive device (DD) including a motor for driving a driven component, a drive controller performs a drive control for PGD and DD and a switching control for a switching device. During a parallel connection, respective high-voltage side terminals (HVTs) of PGD and the battery are connected to a HVT of DD, and respective low-voltage side terminals (LVTs) of PGD and the battery are connected to LVT of DD. During a series connection, HVT of any one of PGD and the battery is connected to HVT of DD, and
(Continued)

LVT of another one of PGD and the battery is connected to LVT of DD, and terminals of PGD and the battery, which are not connected to DD, are connected to each other.

19 Claims, 10 Drawing Sheets

(51) Int. Cl.
*B60K 6/40* (2007.10)
*B60W 20/00* (2016.01)
*F02D 29/06* (2006.01)
*B60K 6/46* (2007.10)
*B60K 6/26* (2007.10)
*F02D 29/02* (2006.01)
*B60L 50/13* (2019.01)
*B60L 58/12* (2019.01)
*B60L 50/51* (2019.01)
*B60L 50/15* (2019.01)
*B60W 20/15* (2016.01)
*B60K 6/442* (2007.10)
*B60W 10/02* (2006.01)
*B60W 10/06* (2006.01)

(52) U.S. Cl.
CPC .............. *B60K 6/46* (2013.01); *B60L 50/13* (2019.02); *B60L 50/15* (2019.02); *B60L 50/51* (2019.02); *B60L 58/12* (2019.02); *B60W 10/02* (2013.01); *B60W 10/06* (2013.01); *B60W 10/08* (2013.01); *B60W 20/00* (2013.01); *B60W 20/15* (2016.01); *F02D 29/02* (2013.01); *F02D 29/06* (2013.01); *B60L 2210/30* (2013.01); *B60L 2210/40* (2013.01); *B60L 2240/12* (2013.01); *B60L 2240/425* (2013.01); *B60L 2240/54* (2013.01); *B60W 2710/0644* (2013.01); *B60W 2710/0666* (2013.01); *B60W 2710/081* (2013.01); *B60W 2710/083* (2013.01); *B60Y 2300/182* (2013.01); *Y10S 903/93* (2013.01)

(56) References Cited

FOREIGN PATENT DOCUMENTS

| | | |
|---|---|---|
| JP | 2004-336844 A | 11/2004 |
| JP | 2009-262894 A | 11/2009 |
| JP | 2010-183767 A | 8/2010 |
| WO | WO 2008/062590 A1 | 5/2008 |

OTHER PUBLICATIONS

Office Action dated Jul. 10, 2019 in German Patent Application No. 11 2016 004 906.4, 11 pages (with English translation).

* cited by examiner

| | | SWITCH STATE | | |
|---|---|---|---|---|
| | | CHANGE-OVER SWITCH 601 | CHANGE-OVER SWITCH 602 | CHANGE-OVER SWITCH 603 |
| CONNECTION RELATIONSHIP | PARALLEL | ON | OFF | ON |
| | SERIES | OFF | ON | OFF |

| | | SWITCH STATE | | |
|---|---|---|---|---|
| | | CHANGE-OVER SWITCH 601 | CHANGE-OVER SWITCH 602 | CHANGE-OVER SWITCH 603 |
| CONNECTION RELATIONSHIP | PARALLEL | ON | OFF | ON |
| | SERIES | OFF | ON | OFF |

1

DRIVE SYSTEM AND DRIVE CONTROL METHOD

TECHNICAL FIELD

The present invention relates to a drive system and a drive control method for drive control of a drive device and a power generation device, which are applied to, for example, a drive mechanism for an electric vehicle and a hybrid vehicle.

BACKGROUND ART

For example, in a related-art vehicle drive system of Patent Literature 1 described below, there has been proposed a system in which a boost converter is arranged between a battery and a motor to cover a drive region with use of a small-size motor without increasing the number of series-connected cells of a battery.

Further, for example, in Patent Literature 2 described below, there has been proposed a control method of switching a series connection and a parallel connection of a plurality of batteries to prevent degradation in chargeability of the batteries during low-speed traveling and degradation of the batteries due to a large charge current during high-speed traveling.

CITATION LIST

Patent Literature

[PTL 1] WO 2008/062590 (pamphlet)
[PTL 2] JP 3-203501 A

SUMMARY OF INVENTION

Technical Problem

In the above-mentioned related-art vehicle drive system, when the boost converter is used, as described in Patent Literature 1, an additional component, that is, a boost converter is required. An output which is equivalent to that of a motor and an inverter is required for the boost converter. An effect achieved through downsizing of a motor is cancelled out by the addition of the boost converter, with the result that the effect of downsizing of a system is reduced. Further, the boost converter requires a switching operation of a power semiconductor switch and a boost reactor, and loss occurs in each of those. Thus, cooling which is equivalent to that for the motor and the inverter is required. For example, when water cooling is to be performed, it is required that a water-cooling pipe be connected to the boost converter.

Meanwhile, in Patent Literature 2, there is described the method of switching the series connection and the parallel connection of the plurality of batteries to increase an operation range of the motor. However, there is a problem in that increase in the number of components results in upsizing of the device. Further, the state of connecting the batteries in series merely corresponds to use of a single high-voltage battery.

The present invention has been made to solve the above-mentioned problems, and has an object to obtain a drive system which has a simple structure and can be downsized, and a drive control method.

Solution to Problem

According to one embodiment of the present invention, there is provided, for example, a drive system, including: a battery; a power generation device which includes a generator mounted to a shaft of an engine; a drive device which includes a motor configured to drive a driven component; a switching device configured to switch a connection relationship of the battery and the power generation device at both ends of the drive device into a series connection and a parallel connection; and a drive controller configured to perform a drive control for the power generation device and the drive device and a switching control for the switching device, in which, during the parallel connection, the drive controller controls the switching device to connect respective high-voltage side terminals of the power generation device and the battery to a high-voltage side terminal of the drive device, and connect respective low-voltage side terminals of the power generation device and the battery to a low-voltage side terminal of the drive device, and in which, during the series connection, the drive controller controls the switching device to connect the high-voltage side terminal of any one of the power generation device and the battery to the high-voltage side terminal of the drive device, connect the low-voltage side terminal of another one of the power generation device and the battery to the low-voltage side terminal of the drive device, and connect terminals of the power generation device and the battery, which are not connected to the drive device, to each other.

Advantageous Effects of Invention

According to present invention, it is possible to obtain the drive system which has the simple structure and can be downsized, and the drive control method.

DESCRIPTION OF EMBODIMENTS

According to the present invention, a switching device which is configured to switch a series connection and a parallel connection of a battery and a power generation device as seen from a drive device is provided, thereby being capable of downsizing the motor without increasing a capacity of the battery and the number of serial-connected cells.

The range of application of a drive system and a drive control method according to the present invention is not limited to an automobile. For example, the present invention is applicable to a train, or in a broader sense, to a device including a drive and power-generation mechanism configured to drive a driven component with use of a drive device to which a battery and a power generation device are connected.

Now, description is made of the drive system and the drive control method according to embodiments of the present invention with reference to the drawings. In the embodiments, description is made of an exemplary case in which the present invention is applied to an electric vehicle and a hybrid vehicle, which are familiar. In the embodiments, the same or corresponding components are denoted by the same reference symbols, and redundant description is omitted.

First Embodiment (Engine is not Connected to Drive Wheels, and Battery is Provided on Ground Side)

Figure 1:
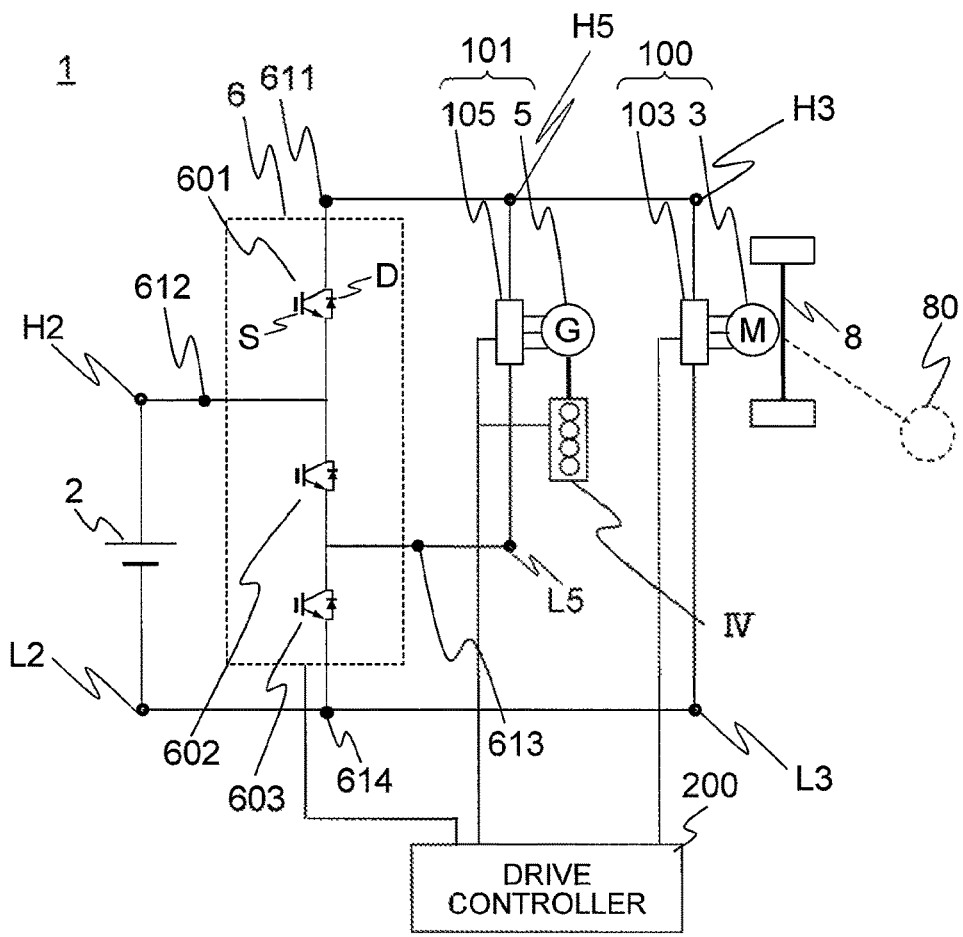
FIG. 1 is a diagram for illustrating a configuration of a drive system according to a first embodiment of the present invention.

FIG. 1 is a diagram for illustrating a configuration of an automobile drive system according to a first embodiment of the present invention. In FIG. 1, an automobile drive system 1 includes a direct-current battery 2, a drive device 100, a power generation device 101, a switching device 6, and a drive controller 200.

The drive device 100 includes an inverter 103 and a motor (M) 3 connected to the inverter 103. The inverter 103 is connected to the battery 2, and mutually converts direct-current power and alternate-current power. The motor 3 is a rotary electric machine which drives drive wheels 8 of the vehicle to rotate by converting alternate-current power into mechanical energy. The drive wheels 8 correspond to driven components in the case of a drive system for an automobile. Further, general driven components other than the automobile are symbolically illustrated as a driven component 80 by the broken lines.

The power generation device 101 includes an engine 4, a generator (G) 5 mounted to a shaft of the engine 4, and an inverter 105. The generator 5 is a rotary electric machine which converts driving power into electric power. The inverter 105 is connected to the battery 2 and the generator 5, and mutually converts direct-current power and alternate-current power.

The motor 3 and the generator 5 are each a three-phase interior permanent magnet synchronous motor in which a permanent magnet is provided in a rotor. However, for example, an induction motor or a synchronous reluctance motor may be used.

The engine 4 is connected to the generator 5, but is not connected to the drive wheels 8 of the automobile. Thus, the automobile of the first embodiment represents a case of an electric vehicle which is not directly driven by the engine 4.

Figure 2:
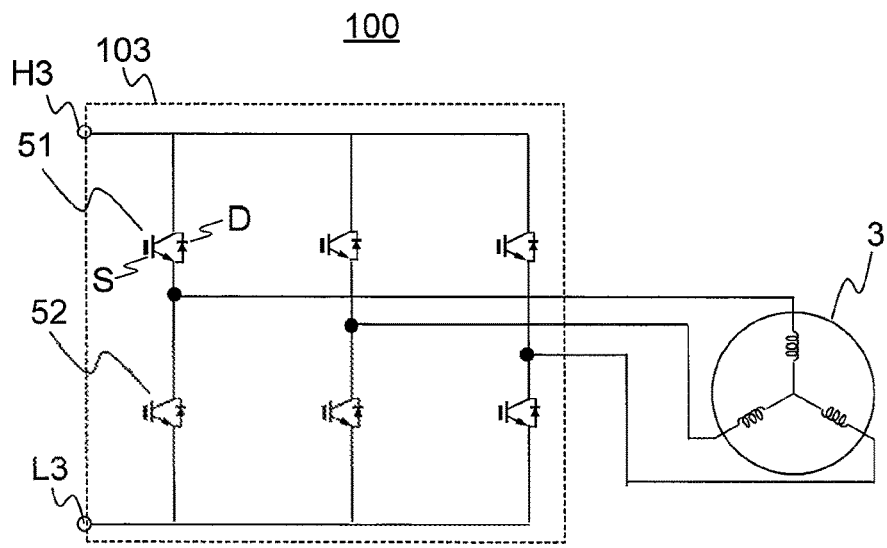
FIG. 2 is a diagram for illustrating an example of a configuration of a drive device of FIG. 1.

FIG. 2 is a diagram for illustrating an example of a configuration of the drive device 100 of FIG. 1. As illustrated in FIG. 2, in the inverter 103, a change-over switch including a power semiconductor switch S and a free-wheeling diode D connected in parallel is arranged on each of two arms connected in series, thereby forming each of series circuits. The number of series circuits corresponds to the number of phases. That is, three series circuits are connected in parallel.

A coil corresponding to one of three phases of the motor 3 is connected to a connection point between an upper arm 51 on a high-voltage side and a lower arm 52 on a low-voltage side of the arms connected in series. Coils corresponding to other two phases of the motor 3 are connected respectively to connection points of other two pairs, which each include an upper arm and a lower arm, connected in parallel.

The inverter 105 of the power generation device 101 has a configuration similar to the configuration illustrated in FIG. 2, and is connected to coils of three phases of the generator 5.

The power semiconductor switches S constructing the inverter 103 and the inverter 105 employ IGBT using a silicon semiconductor. However MOSFET may be employed. Further, as a material of the power semiconductor switch S, there may be employed a wide band gap semiconductor such as silicon carbide (SiC) or gallium nitride (GaN).

The battery 2 is a lithium ion battery. However, other secondary batteries such as a nickel hydrogen battery may be employed.

In FIG. 1, the switching device 6 includes three change-over switches, that is, a change-over switch 601, a change-over switch 602, and a change-over switch 603, which are connected in series. Each of the change-over switches 601 to 603 includes a semiconductor switch S and a free-wheeling diode D connected in parallel. The switching device 6 includes four connection terminals, that is, a first connection terminal 611, a second connection terminal 612, a third connection terminal 613, and a fourth connection terminal 614. The first connection terminal 611 is provided on one end side of the change-over switch 601. The second connection terminal 612 is provided at a connection point between another end side of the change-over switch 601 and one end side of the change-over switch 602. The third connection terminal 613 is provided at a connection point between another end side of the change-over switch 602 and one end side of the change-over switch 603. The fourth connection terminal 614 is provided on another end side of the change-over switch 603. Among the four connection terminals 611 to 614, the first connection terminal 611 is connected to a direct-current high-voltage side terminal H5 of the inverter 105, that is, the power generation device 101 and to a direct-current high-voltage side terminal H3 of the motor 3, that is, the drive device 100. The second connection terminal 612 is connected to a high-voltage side terminal H2 of the battery 2. The third connection terminal 613 is connected to a direct-current low-voltage side terminal L5 of the inverter 105, that is, the power generation device 101. The fourth connection terminal 614 is connected to a low-voltage side terminal L2 of the battery 2 and to a direct-current low-voltage side terminal L3 of the motor 3, that is, the drive device 100.

Figure 11:
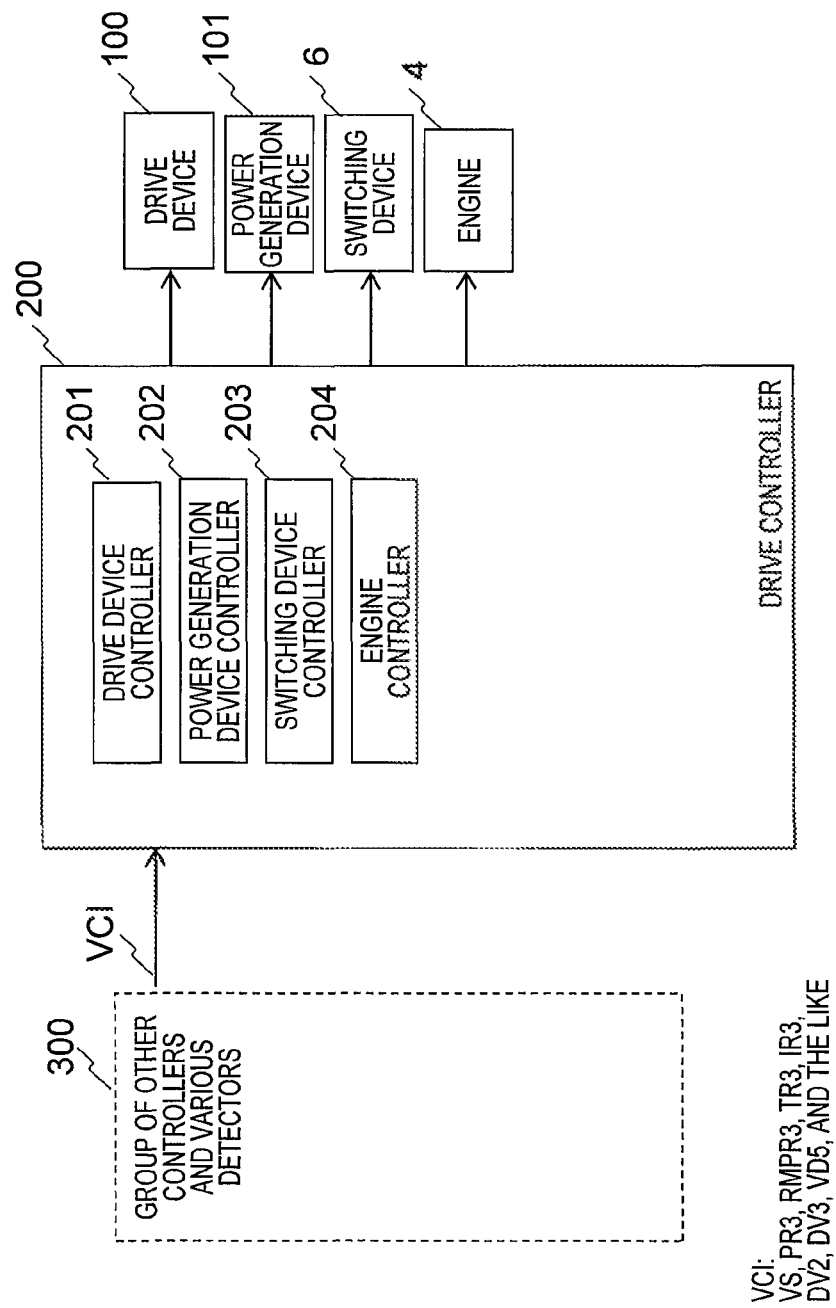
FIG. 11 is a functional block diagram for illustrating a periphery of a drive controller of the drive system according to the present invention.
Figure 12:
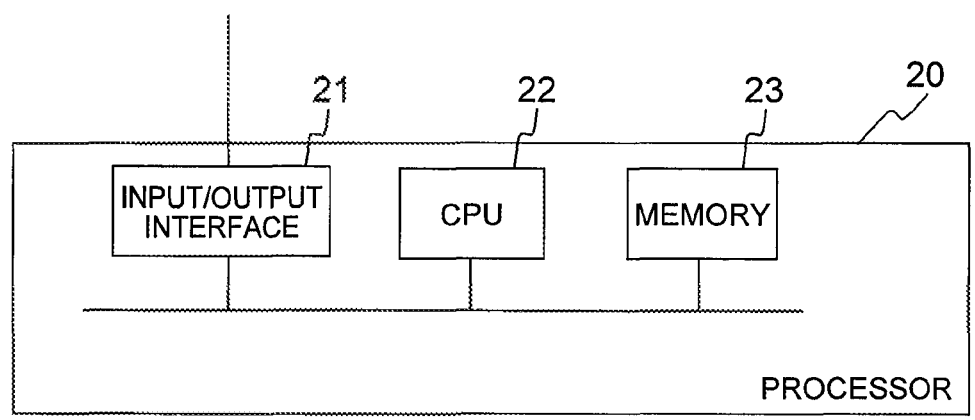
FIG. 12 is a schematic view for illustrating an example of a configuration of the drive controller of the drive system according to the present invention.

The drive controller 200 controls the drive device 100, the power generation device 101, and, the engine 4 in accordance with conditions of the vehicle given by vehicle condition information VCI, and controls opening and closing of the change-over switches 601 to 603 of the switching device 6 to switch the series connection and the parallel connection of the battery 2 and the power generation device 101 between both ends of the drive device 100. FIG. 11 is a functional block diagram for illustrating a periphery of the drive controller 200. For example, as schematically illustrated in FIG. 12, the drive controller 200 includes a processor 20, which is constructed by a CPU 22, a memory 23, and an input/output interface 21. The memory 23 stores programs for processing functions, which are illustrated in the block diagram of FIG. 11 and in an operation flowchart of FIG. 13, together with data including various maps and set values described later for use in the processing, and the processing is executed by the CPU 22 in accordance with the programs.

In FIG. 11, the drive controller 200 includes a drive device controller 201, a power generation device controller 202, a switching device controller 203, and an engine controller 204. Although detailed illustration is omitted, the drive device 100, the power generation device 101, the engine 4, and the switching device 6 are controlled in accordance with vehicle condition information VCI given by a group 300 of other controllers and various detectors constructed by detectors and other controllers provided at various locations in the vehicle.

The vehicle condition information VCI given by the group 300 of other controllers and various detectors includes a voltage DV2 of the battery 2, a voltage DV5 of the power generation device 101, and a voltage DV3 of the drive device 100, which are given by various detectors, and a vehicle speed VS, an electric power PR3, a revolution speed RPMR3, a torque TR3, and a current IR3 of the motor 3 required for the motor 3, which are given by other controllers. In practice, those information pieces are transmitted in a form of signals indicating respective values.

Figures 3, 4:
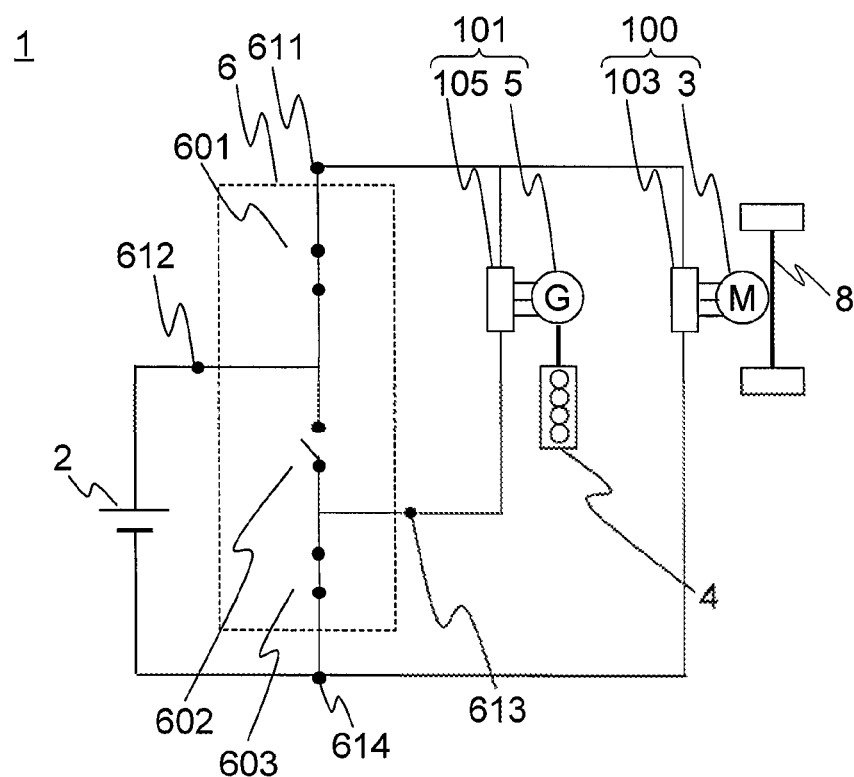
FIG. 3 is a table for showing ON/OFF states of change-over switches of a switching device of FIG. 1 and connection relationships of a battery and a power generation device in those states.
FIG. 4 is a diagram for illustrating a state of a circuit during a parallel connection of the drive system according to the first embodiment of the present invention.
Figure 5:
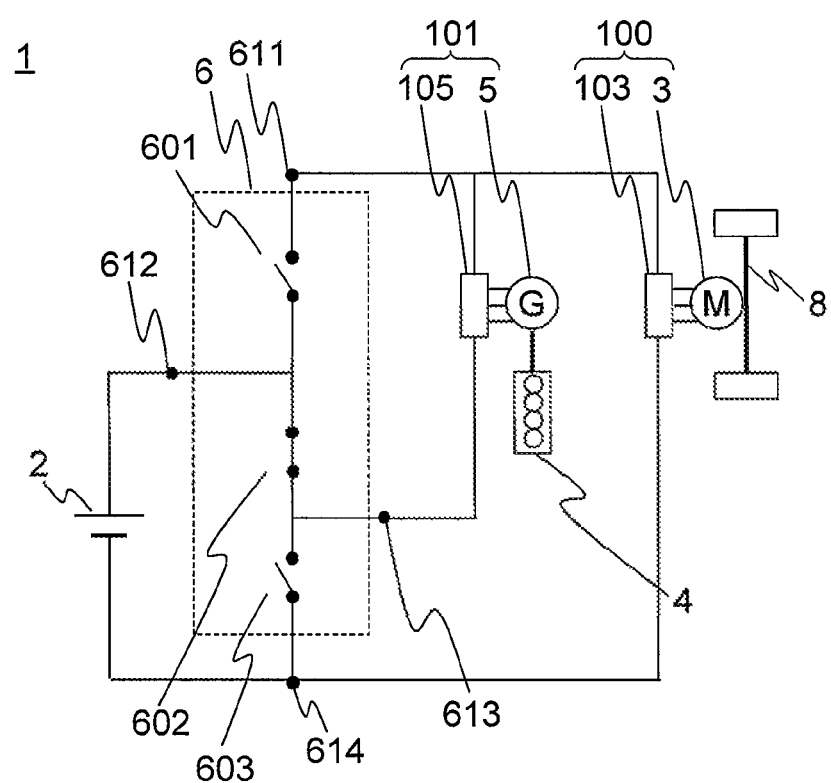
FIG. 5 is a diagram for illustrating a state of the circuit during a serial connection of the drive system according to the first embodiment of the present invention.

FIG. 3 is a table for showing ON/OFF states of the charge-over switches 601 to 603 of the switching device 6 of FIG. 1 and connection relationships of the battery 2 and the power generation device 101 in those states. FIG. 4 is an illustration of a state of the circuit of FIG. 1 when the battery 2 and the power generation device 101 are connected in parallel. FIG. 5 is an illustration of a state of the circuit of FIG. 1 when the battery 2 and the power generation device 101 are connected in series. FIG. 4 and FIG. 5 are explanatory diagrams for illustrating switching of connections of the circuit.

Next, description is made of an operation of switching the series connection and the parallel connection of the battery 2 and the power generation device 101 as seen from the drive device 100 in the automobile drive system according to the first embodiment, that is, an operation of switching the series connection and the parallel connection of the battery 2 and the power generation device 101 between both ends of the drive device 100. In the following, the drive device 100 is sometimes described as the motor 3 or the inverter 103, and the power generation device 101 is sometimes described as the generator 5 or the inverter 105.

Figure 13:
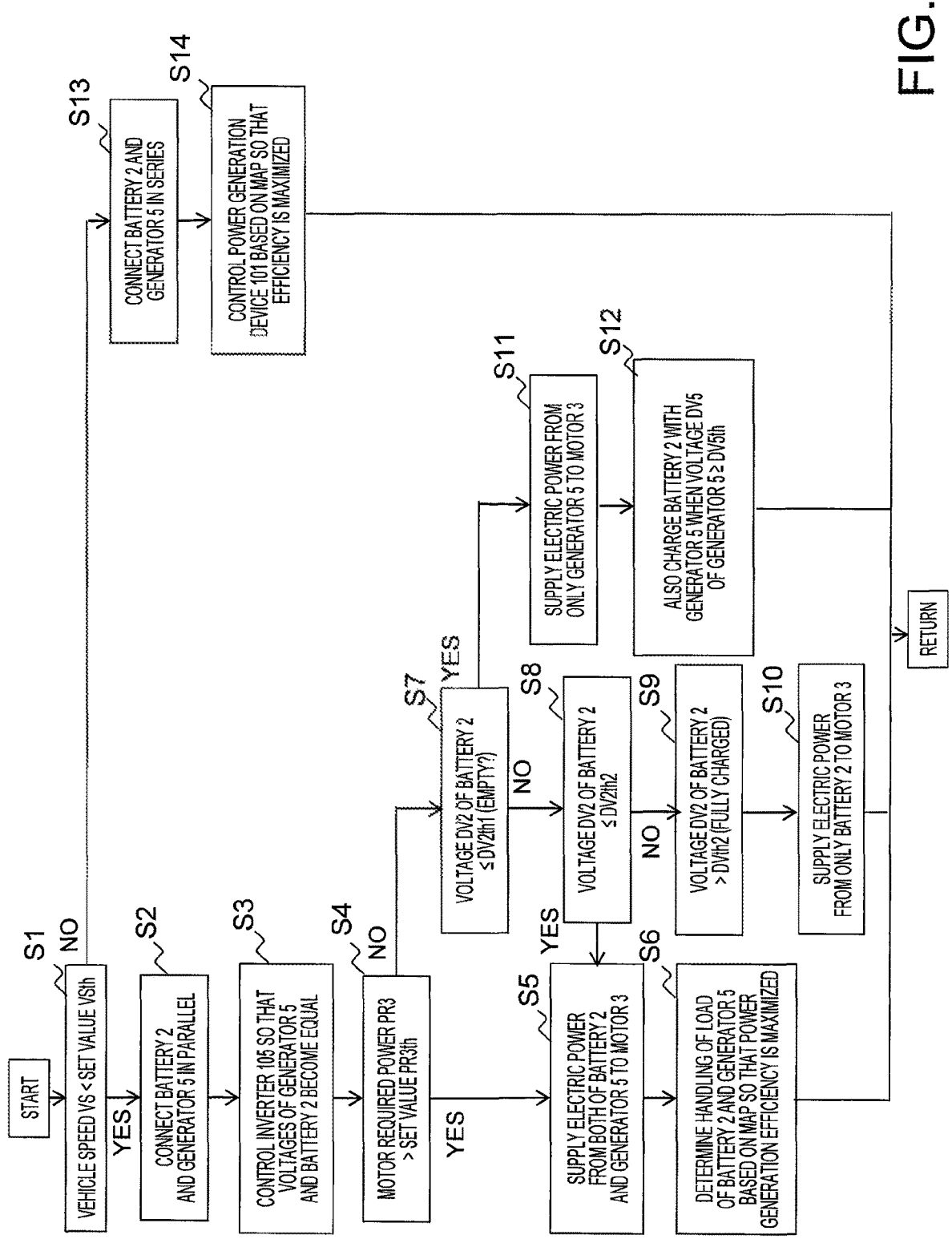
FIG. 13 is an operation flowchart for illustrating a control by the drive controller of the drive system according to the present invention.

FIG. 13 is an operation flowchart of operations performed in accordance with a control by the drive controller 200, and description is made of a control operation by the present invention.

The operation of switching the series connection and the parallel connection of the battery 2 and the power generation device 101 is performed in accordance with the control by drive controller 200. When the vehicle speed VS given by the group 300 of other controllers and various detectors of FIG. 11 is, for example, less than a set speed VSth which is half of a maximum vehicle speed (Step S1), the battery 2 and the generator 5 are connected in parallel as seen from the motor 3 by the switching device 6 in accordance with a control by the drive controller 200. At this time, as illustrated in FIG. 3 and FIG. 4, the three change-over switches 601 to 603 of the switching device 6 are set to the following states (Step S2).

Change-over switch 601: ON state
Change-over switch 602: OFF state
Change-over switch 603: ON state The voltage of the battery 2 differs depending on a state of charge. However, the drive controller 200 monitors the voltage DV2 of the battery 2 and the voltage DV5 of the power generation device 101 given by the group 300 of other controllers and various detectors, and controls the inverter 105 so that the voltage of electric power generated by the generator 5 becomes equal to or substantially equal to the voltage of the battery 2 (Step S3).

At this time, the electric power PR3, the revolution speed RPMR3, and the torque TR3 required for the motor 3 are determined in accordance with a state of operation based on the vehicle speed VS and the vehicle condition information VCI of the vehicle. A relationship of exchange of the electric power at this time is defined by the following three cases in accordance with the electric power PR3 required for the motor 3 and the state of charge, that is, the voltage DV2 of the battery 2.

1) First, there is a case in which the electric power PR3 required for the motor 3 is larger than a set electric power value PR3th, that is, the required electric power PR3 cannot be covered by only one of the battery 2 and the generator 5 (Step S4).

Next, there is a case in which the electric power PR3 required for the motor 3 is equal to or less than a middle level and is equal to or less than the set electric power value PR3th, that is, the electric power PR3 required for the motor 3 can be covered by only one of the battery 2 and the generator 5 (Step S4), and the state of charge, that is, the voltage DV2 of the battery 2 is equal to or less than a second set voltage value DV2th2 (Step S8). In Step S7, DV2th1<DV2th2 is satisfied as described later, and determine of "No" is given.

In the case of the two states described above the electric power is supplied from both of the battery 2 and the generator 5 to the motor 3 (Step S5).

At this time, the sharing of the load between the battery 2 and the generator 5 is determined in accordance with a predetermined map stored in advance, for example, in the memory 23 of the processor 20 so that the power-generation efficiency of the engine 4, the generator 5, and the inverter 105 is maximized (Step S6). At this time, the direct-current voltage DV5 of the inverter 105 becomes equal to the direct-current voltage DV2 of the battery 2. The predetermined map is used after being corrected by the direct-current voltage DV2 of the battery 2 given at this time. Further, the map to be used is an efficiency map which is obtained by multiplying the revolution speed and the torque by an efficiency of the engine 4, an efficiency of the generator 5, and an efficiency of the inverter 105, and is determined so that the efficiency is maximized on an equal output line of a required output.

That is, in this case, the revolution speed RPM4 of the engine 4 is adjusted in accordance with the revolution speed RPMR3 and the torque TR3 required for the motor 3 and the voltage DV2 of the battery 2.

2) Next, in the case in which the electric power PR3 required for the motor 3 is equal to or less than the middle level and is equal to or less than the set electric power value PR3th, that is, the required electric power can be covered by only one of the battery 2 and the generator 5 (Step S4), and the state of charge of the battery 2 is close to the fully-charged state, that is, the voltage DV2 is more than the second set voltage value DV2th2 (Step S8 and Step S9), the electric power is supplied to the motor 3 from only the battery 2 (Step S10).

3) Finally, in the case in which the electric power PR3 required for the motor 3 is equal to or less than the middle level and is equal to or less than the set electric power value PR3th, that is, the required electric power can be covered by only one of the battery 2 and the generator 5, and the state of charge of the battery 2 is less than a predetermined value and is close to an empty state, that is, the voltage DV2 is equal to or less than a first set voltage value DV2th1 (DV2th1<DV2th2) (Step S7), the electric power is supplied to the motor 3 from only the generator 5 (Step S11). At this time, in the case in which the generator 5 has sufficient output, and the voltage DV5 of the generator 5 is equal to or more than a set voltage value DV5th, the electric power is supplied from the generator 5 also to the battery 2 to perform a charging operation (Step S12). At this time, the electric power to be supplied to the battery 2 is adjusted with use of the efficiency map so as to improve the efficiency of the generator 5.

Next, when the vehicle speed of the automobile is equal to or more than the set speed VSth which is half of the maximum vehicle speed (Step S1), the battery 2 and the generator 5 are connected in series as seen from the motor 3 by the switching device 6. At this time, as illustrated in FIG. 3 and FIG. 5, the three change-over switches 601 to 603 of the switching device 6 are set to the following states (Step S13).

Change-over switch 601: OFF state
Change-over switch 602: ON state
Change-over switch 603: OFF state At this time, the direct-current voltage DV3 of the inverter 103 and the motor 3 corresponds to a total value of the voltage DV2 of the battery 2 and the direct-current voltage DV5 of the inverter 105. With regard to the direct-current voltage DV5 of the inverter 105, the direct-current voltage DV5 is selected so that the maximum efficiency is obtained based on multiplication of an efficiency map indicating a total efficiency of the inverter 103 and the motor 3 with respect to the direct-current power supply voltage satisfying DV5+DV2 with reference to the direct-current voltage DV2 of the battery 2 and an efficiency map indicating a total efficiency of the engine 4, the generator 5, and the inverter 105 with respect to the direct-current power supply voltage (Step S14).

Further, at this time, when the voltage DV2 of the battery 2 decreases, in order to increase the voltage DV5 of the inverter 105 and the generator 5, which corresponds to the voltage of the power generation device 101, for example, the revolution speed RPM4 of the engine 4 and the revolution speed RPM5 of the generator 5 are increased.

With such a configuration, the relationship of the series connection and the parallel connection of the battery 2 and the generator 5 as seen from the motor 3 is switched by the switching device 6 so that the direct-current voltage DV3 applied to the inverter 103 and the motor 3 can be switched, thereby being capable of downsizing the motor 3. Further, the switching device 6 can be operated without a switching operation of the power semiconductor switch during a high-voltage operation of the automobile drive system 1, and hence switching loss does not occur in the power semiconductor switch, thereby being capable of improving the efficiency of the automobile drive system 1. Further, the switching device 6 does not require a reactor such as a boost reactor for storing electric power, thereby being capable of downsizing the automobile drive system 1.

The engine 4 of the first embodiment is not connected to the drive wheels 8 of the automobile, and the revolution speed RPM4 of the engine 4 and the revolution speed RPM5 of the generator 5 can be suitably selected in accordance with the revolution speed RPMR3 and the torque TR3 required for the motor 3 and the direct-current voltage DV2 of the battery 2 regardless of the vehicle speed VS of the automobile, thereby being capable of improving the drive efficiency of the automobile drive system.

In the above-mentioned first embodiment, when the vehicle speed VS of the automobile is less than about half of the maximum speed, the battery 2 and the generator 5 are connected in parallel as seen from the motor 3 by the switching device 6, and the revolution speed of the engine 4 is changed so that the efficiency of the automobile drive system 1 is maximized in accordance with the revolution speed and the torque required for the motor 3 and the direct-current voltage of the battery 2. However, a control may be performed with use of an efficiency map to maximize the efficiency of the generator 5 so that a temperature TMP5 of the generator 5 does not become equal to or more than a certain value. In such a manner, thermal limitation on the generator 5 can be moderated, thereby being capable of downsizing the generator 5.

Further, in the above-mentioned first embodiment, when the vehicle speed of the automobile is equal to or more than the set speed VSth which is half of the maximum vehicle speed, the battery 2 and the generator 5 are connected in series as seen from the motor 3 by the switching device 6, and the direct-current voltage DV5 of the inverter 105 is reversely calculated from the map so that the efficiency of the automobile drive system 1 is maximized but is set so as to be equal to or more than the direct-current voltage DVR3 required for the inverter 103. With such a configuration, even when the direct-current power supply voltage decreases in accordance with the state of charge of the battery 2, the direct-current voltage to be applied to the inverter 103 can be compensated by increasing the direct-current voltage of the inverter 105, that is, the power generation device 101. In general, a system in which the motor 3 and the inverter 103 operate with only the battery 2 as a direct power supply is designed so that the system can be operated in a required operation region even when the power supply voltage DV2 of the battery 2 decreases. Therefore, under a condition in which a sufficient power supply voltage is given, the motor 3 is designed with over performance. In this regard, through compensation of the direct-current voltage in such a manner, the performance required for the motor 3 is moderated, thereby being capable of downsizing the motor 3.

Second Embodiment (Engine is not Connected to Drive Wheels, and Generator is Provided on Ground Side)

Figures 6, 7:
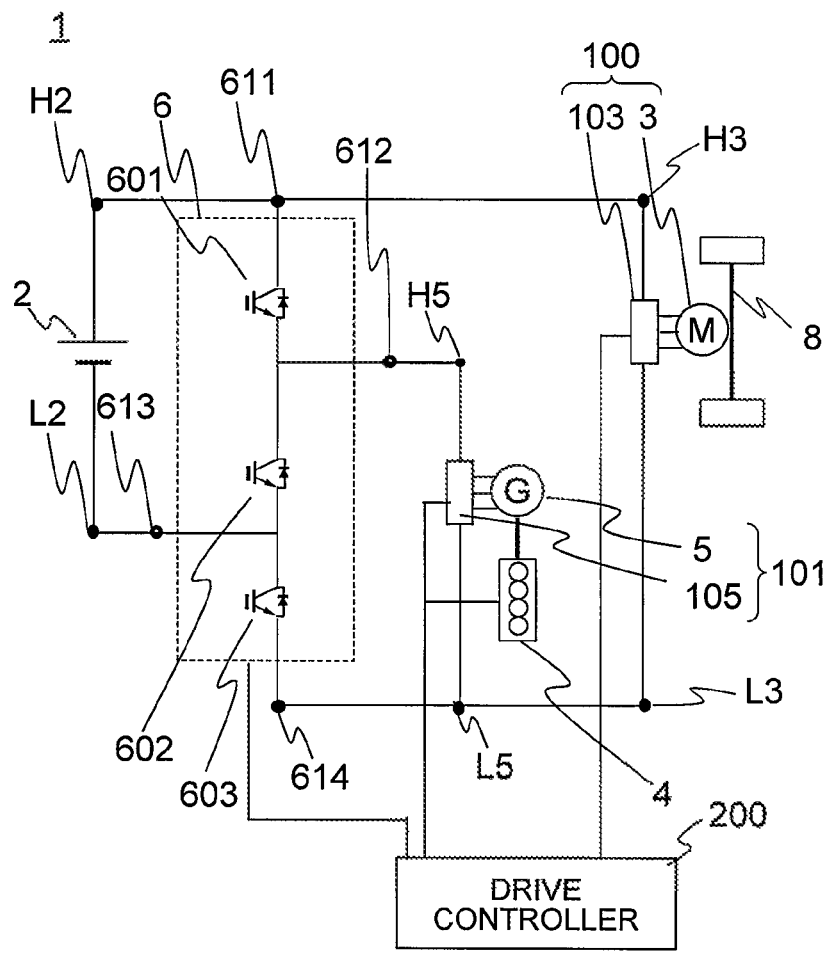
FIG. 6 is a diagram for illustrating a configuration of a drive system according to a second embodiment of the present invention.
FIG. 7 is a table for showing ON/Off states of the change-over switches of the switching device of FIG. 1 and connection relationships of the battery and the power generation device in those states.
Figure 8:
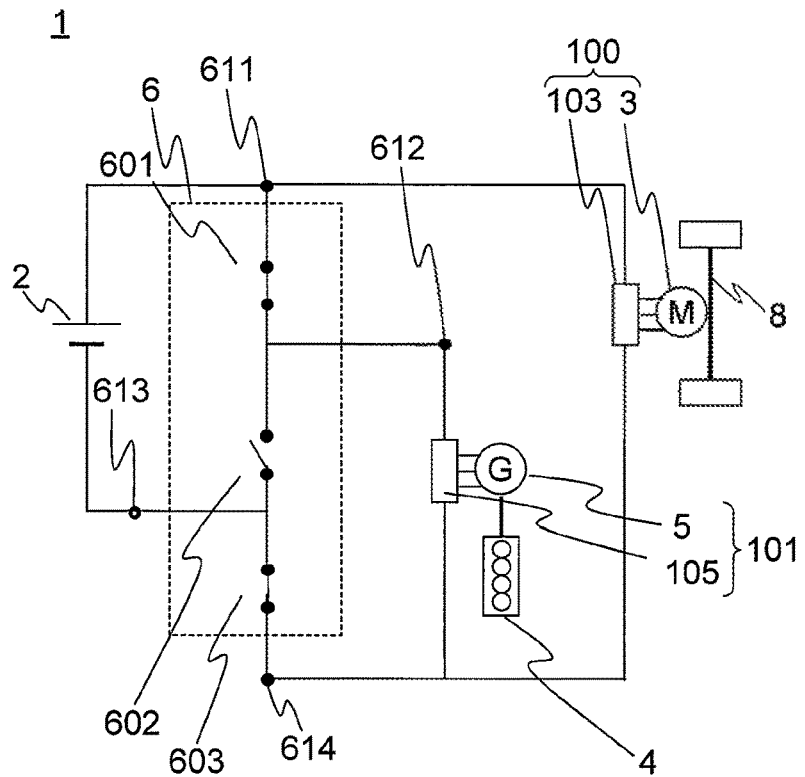
FIG. 8 is a diagram for illustrating a state of a circuit during a parallel connection of the drive system according to the second embodiment of the present invention.
Figure 9:
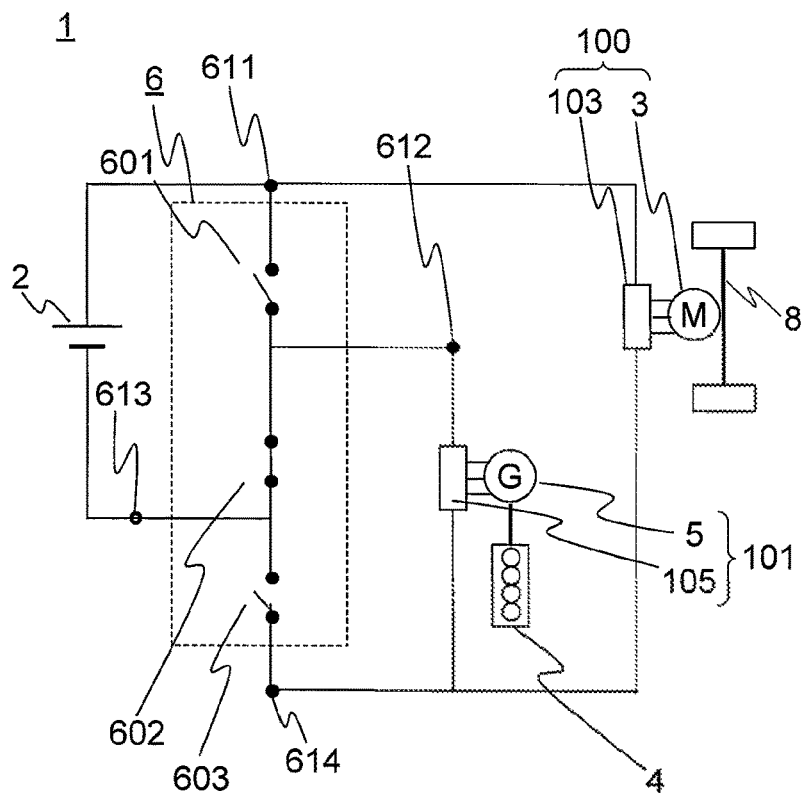
FIG. 9 is a diagram for illustrating a state of the circuit during a series connection of the drive system according to the second embodiment of the present invention.

FIG. 6 is a diagram for illustrating a configuration of an automobile drive system according to a second embodiment of the present invention. FIG. 7 is a table for showing ON/OFF states of the change-over switches 601 to 603 of the switching device 6 of FIG. 6 and connection relationships of the battery 2 and the power generation device 101 in those states. FIG. 8 is an illustration of a state of the circuit of FIG. 6 when the battery 2 and the power generation device 101 are connected in parallel. FIG. 9 is an illustration of a state of the circuit of FIG. 6 when the battery 2 and the power generation device 101 are connected in series. FIG. 8 and FIG. 9 are explanatory diagrams for illustrating switching of connections of the circuit.

In FIG. 6, among the four terminals of the switching device 6, the connection terminal 611 is connected to respective high-voltage side terminals of the battery 2 and the inverter 103. The connection terminal 612 is connected to a high-voltage side terminal of the inverter 105. The connection terminal 613 is connected to a low-voltage side terminal of the battery 2. The connection terminal 614 is connected to respective low-voltage side terminals of the inverter 105 and the inverter 103.

In FIG. 6, the switching device 6 includes three change-over switches, that is, the change-over switch 601, the change-over switch 602, and the change-over switch 603, which are connected in series. The switching device 6 includes four connection terminals, that is, the first connection terminal 611, the second connection terminal 612 the third connection terminal 613, and the fourth connection terminal 614. The first connection terminal 611 is provided on one end side of the change-over switch 601. The second connection terminal 612 is provided at a connection point between another end side of the change-over switch 601 and one end side of the change-over switch 602. The third connection terminal 613 is provided at a connection point between another end side of the change-over switch 602 and one end side of the change-over switch 603. The fourth connection terminal 614 is provided on another end side of the change-over switch 603. Among the four connection terminals 611 to 614, the first connection terminal 611 is connected to the high-voltage side terminal H2 of the battery 2 and to the direct-current high-voltage side terminal H3 of the motor 3, that is, the drive device 100. The second connection terminal 612 is connected to the direct-current high-voltage side terminal H5 of the inverter 105, that is, the power generation device 101. The third connection terminal 613 is connected to the low-voltage side terminal L2 of the battery 2. The fourth connection terminal 614 is connected to the direct-current low-voltage side terminal L5 of the inverter 105, that is, the power generation device 101 and to the direct-current low-voltage side terminal L3 of the motor 3, that is, the drive device 100.

Description is made of an operation of switching the series connection and the parallel connection of the battery 2 and the generator 5 as seen from the motor 3 of the automobile drive system 1 according to the second embodiment. Similarly to the above-mentioned embodiment, when the vehicle speed VS of the automobile is, for example, less than the set speed VSth which is half of the maximum vehicle speed, the battery 2 and the generator 5 are connected in parallel as seen from the motor 3 by the switching device 6. At this time, as illustrated in FIG. 7 and FIG. 8, the three change-over switches 601 to 603 of the switching device 6 are set to the following states.

Change-over switch 601: ON state
Change-over switch 602: OFF state
Change-over switch 603: ON state Next, when the vehicle speed VS of the automobile is, for example, equal to or more than the set speed VSth which is half of the maximum vehicle speed, the battery 2 and the generator 5 are connected in series as seen from the motor 3 by the switching device 6. At this time, as illustrated in FIG. 7 and FIG. 9, the three change-over switches 601 to 603 of the switching device 6 are set to the following states.

Change-over switch 601: OFF state
Change-over switch 602: ON state
Change-over switch 603: OFF state Other configurations are the same as those of the first embodiment.

Also with such a configuration, the relationships of the series connection and the parallel connection of the battery 2 and the generator 5 as seen from the motor 3 can be switched, thereby achieving the effect which is the same as that of the first embodiment.

Moreover, the inverter 105 and the generator 5 are connected to the low-voltage side terminal L2 of the battery 2 through the switching device 6, and hence the voltage of the inverter 105 and the generator 5 as seen from the low-voltage side terminal L2 of the battery 2 is less than that in the case of being connected to the high-voltage side terminal H2 of the battery 2. Therefore, the voltage tolerance performance required for the inverter 105 and the generator 5 can be set lower, thereby being capable of downsizing the inverter 105 and the generator 5.

Third Embodiment (Engine is Connected to Drive Wheels, and Battery is Provided on Ground Side)

Figure 10:
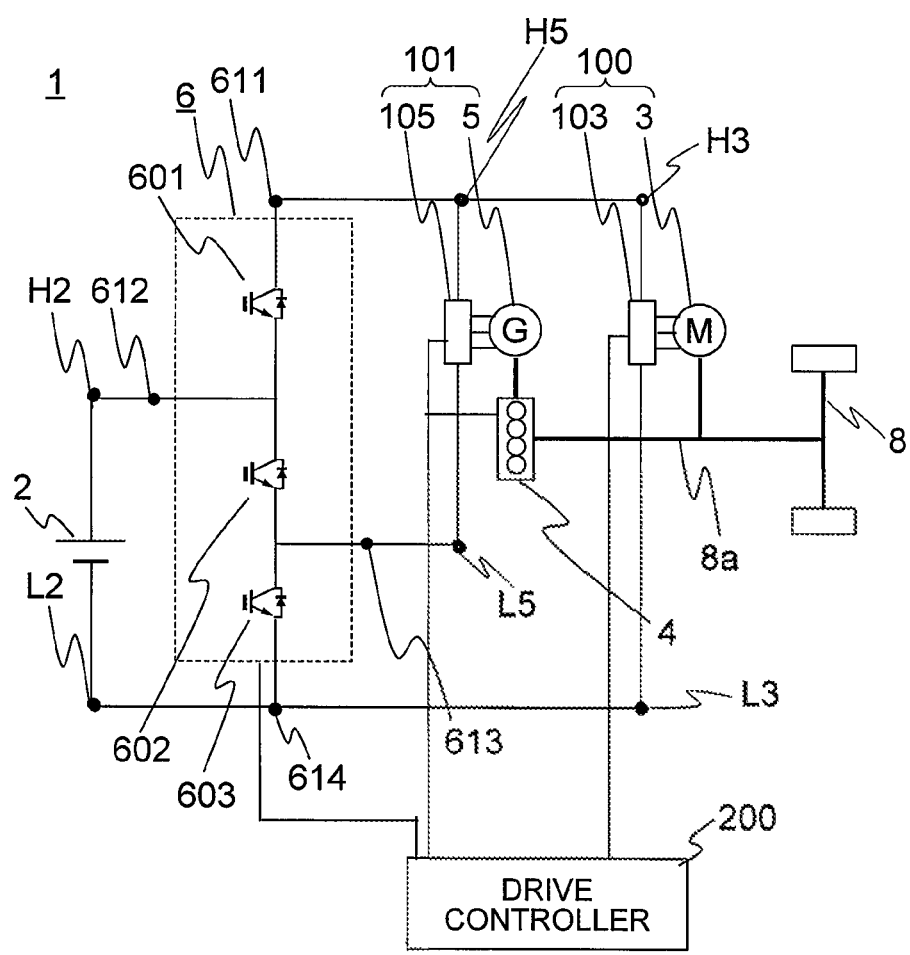
FIG. 10 is a diagram for illustrating a configuration of a drive system according to a third embodiment of the present invention.

FIG. 10 is a diagram for illustrating a configuration of an automobile drive system according to a third embodiment of the present invention. In FIG. 10, an output shaft of the engine 4 is connected to the drive wheels 8 through intermediation of a drive shaft 8a of the automobile. Other configurations are the same as those of the first embodiment. Also in each of the above-mentioned embodiments, in practice, the motor 3 is connected to the drive wheels 8 through intermediation of the drive shaft 8a. The drive shaft 8a is connected to the drive wheels 8 through intermediation of a differential gear (not shown) configured to transmit rotation. The drive shaft 8a can be considered as being the same as the drive wheels 8 as driven components. The automobile of the third embodiment corresponds to a hybrid vehicle which is sometimes directly driven by the engine 4.

In the third embodiment, the load of the engine 4 is a sum total of power for driving the drive wheels 8 to rotate and a load of the generator 5. Thus, for calculation of the power-generation efficiency, the efficiency map for the engine 4 is stored in advance as an efficiency map using a total value of the power for driving the drive wheels 8 to rotate and the load of the generator 5, and the efficiency map is used to calculate the power-generation efficiency.

The output shaft of the engine 4 is connected to the drive wheels 8, and hence the revolution speed RPM4 of the engine 4 and the revolution speed RPM5 of the generator 5 are determined based on the vehicle speed VS of the vehicle. Therefore, when the output is determined, operation points of the engine 4 and the generator 5 are uniquely determined.

Also with such a configuration,the effect which is the same as that of embodiment is achieved.

Fourth Embodiment (Generator is of a Field Winding Type)

Figure 14:
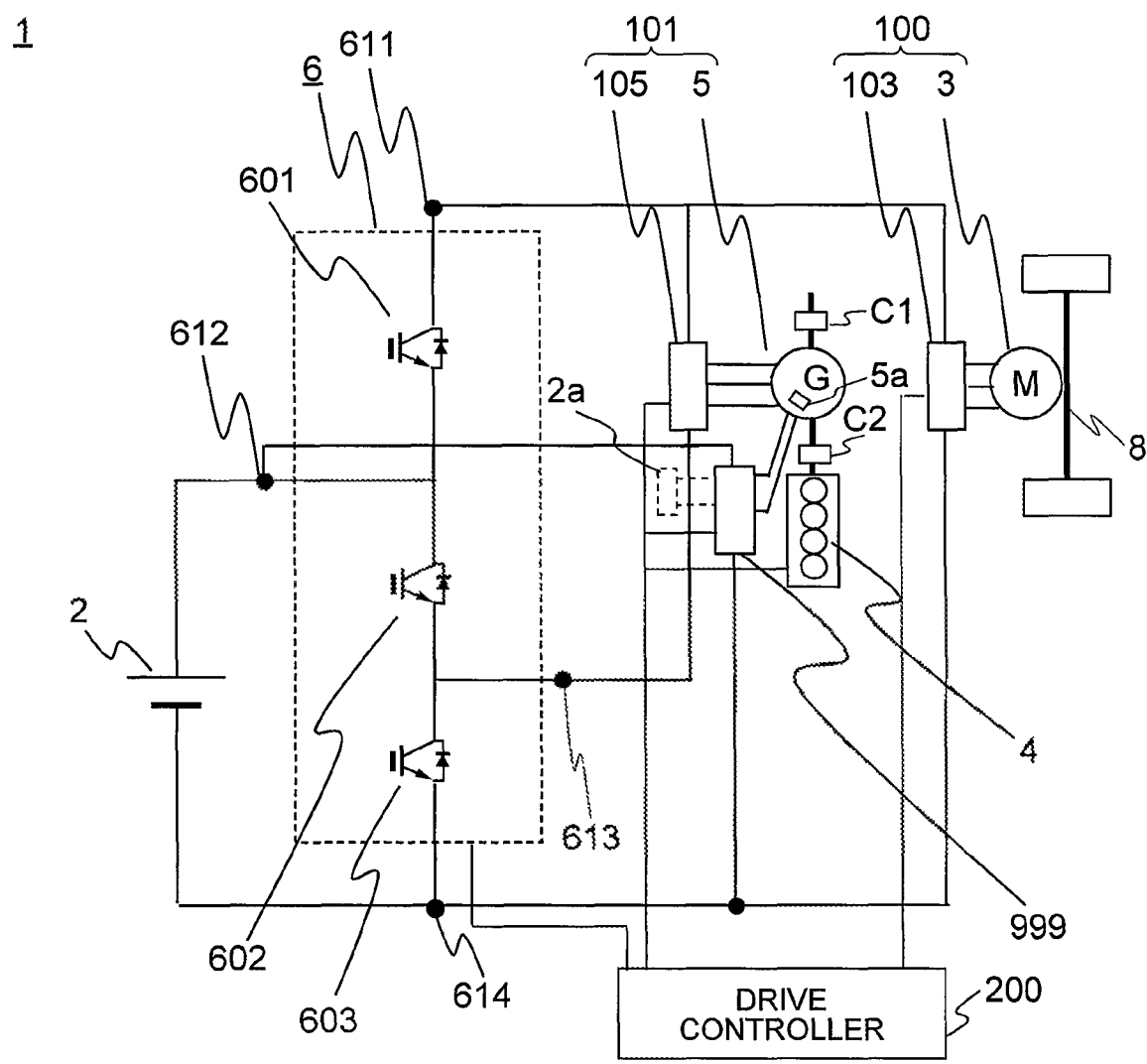
FIG. 14 is a diagram for illustrating a configuration of a drive system according to a fourth embodiment of the present invention.

FIG. 14 is a diagram for illustrating a configuration of an automobile drive system according to a fourth embodiment of the present invention. In FIG. 14, the generator 5 is a rotary electric machine of a field winding type, and is connected to the battery 2 through a field control device 999. Other basic configurations the same as those of the first embodiment.

In the power generation device 101 of the fourth embodiment, the generator 5 is constructed by a crow-pole rotary electric machine of a field winding type. The field electric power is supplied from the battery 2, and a field current is controlled by the field control device 999. Other basic configurations are the same as those of the first embodiment. The field control device 999 is controlled together with the inverter 105 by the power generation device controller 202 of the drive controller 200.

With such a configuration, the power-generation voltage of the generator 5 can be controlled with a current of a field winding 5a, which is symbolically illustrated, in addition to the revolution speed of the engine 4 and the duty of the inverter 105. Therefore, the degree of freedom in obtaining the voltage required for the generator 5 is improved, and hence more efficient control point can be selected. In this case, the operation conditions of the generator 5 are determined using an efficiency map which is calculated in advance and stored in, for example, the memory 23.

In the fourth embodiment, the field winding 5a of the generator 5 connects the battery 2 to supply electric power. However, another battery 2a which is other than the battery 2 and is indicated by the broken lines may be connected to supply the electric power.

Further, in the above-mentioned first to fourth embodiments, it is only necessary that the generator 5 be directly or indirectly connected to the output shaft of the engine 4. That is, the generator 5 may be arranged between the engine 4 and a gear box denoted by the reference symbol C1. Further, the generator 5 may be connected from the output shaft of the engine 4 through intermediation of, for example, a belt as symbolically denoted by the reference symbol C2, or may be connected to the output shaft which is changed in output of the engine 4 by, for example, a gear. In any of those cases the same effect can be achieved.

The present invention is not limited to the above-mentioned embodiments, and may include possible combinations thereof.

Further, as described above, when the application example of the present invention is an automobile or a train, the drive wheels 8 serve as the driven components as in the above-mentioned embodiments. However, the present invention is not limited to application to those, and is applicable to any drive system configured to drive the driven component by a drive device. The above-mentioned driven component 80 symbolically illustrated by the broken lines in FIG. 1 is constructed by drive transmitters of various kinds of equipment such as a drive roller for a belt conveyor and a drive shaft for rotary equipment. In this case, the vehicle speed VS of the vehicle in each embodiment corresponds to a moving speed of a moving portion moved by a motion of the driven component or to a rotation speed of the driven component itself.

INDUSTRIAL APPLICABILITY

The drive system and the drive control method according to the present invention are widely applicable not only to an automobile and a train but also to a drive system including a driven component such as a rotary member or a moving member driven by the drive device.

The invention claimed is:

1. A drive system, comprising:
a battery;
a power generation device which includes an engine, a generator mounted to a shaft of the engine and configured to convert power of the engine into electric power, and an inverter connected to the generator and configured to mutually convert direct-current power and alternate-current power;
a drive device which includes a motor configured to drive a driven component;
a switching device configured to switch a connection relationship of the battery and the power generation device at both ends of the drive device into a series connection and a parallel connection; and
a drive controller configured to perform a drive control for the power generation device and the drive device and a switching control for the switching device,
wherein, during the parallel connection, the drive controller controls the switching device to connect respective high-voltage side terminals of the power generation device and the battery to a high-voltage side terminal of the drive device, and connect respective low-voltage side terminals of the power generation device and the battery to a low-voltage side terminal of the drive device,
wherein, during the series connection, the drive controller controls the switching device to connect the high-voltage side terminal of any one of the power generation device and the battery to the high-voltage side terminal of the drive device, connect the low-voltage side terminal of another one of the power generation device and the battery to the low-voltage side terminal of the drive device, and connect terminals of the power generation device and the battery, which are not connected to the drive device, to each other, and
wherein, when the battery and the power generation device are connected in parallel, the drive controller uses an efficiency map, which is obtained by multiplying a revolution speed of the generator and a torque of the generator by an efficiency of the engine, an efficiency of the generator, and an efficiency of the inverter and setting in advance a total efficiency corrected by a voltage of the battery, to change a revolution speed of the engine corresponding to the revolution speed of the generator in accordance with a revolution speed and a torque required for the motor and a voltage of battery so that the total efficiency is maximized on an equal output line of an output required for the motor.

2. The drive system according to claim 1, wherein the switching device includes three change-over switches connected in series, and both ends of the three change-over switches connected in series and connection points between the three change-over switches correspond to connection terminals with respect to the drive device, the power generation device, and the battery.

3. The drive system according to claim 1,
wherein the engine is prevented from being connected to the driven component, and
wherein, when the battery and the power generation device are connected in parallel, in a case in which a required electric power calculated from a revolution speed and a torque required for the motor is more than a set electric power value, or the battery voltage is more than a first set voltage value and equal to or less than a second set voltage value, the drive controller uses the efficiency map to determine sharing of a load of the battery and the generator so that the total efficiency is maximized and changes a revolution speed of the engine corresponding to a revolution speed of the generator, in accordance with a revolution speed and a torque required for the motor and a voltage of the battery.

4. The drive system according to claim 2,
wherein the engine is prevented from being connected to the driven component, and
wherein, when the battery and the power generation device are connected in parallel, in a case in which a required electric power calculated from a revolution speed and a torque required for the motor is more than a set electric power value, or the battery voltage is more than a first set voltage value and equal to or less than a second set voltage value, the drive controller uses the efficiency map to determine sharing of a load of the battery and the generator so that the total efficiency is maximized and changes a revolution speed of the engine corresponding to a revolution speed of the generator, in accordance with a revolution speed and a torque required for the motor and a voltage of the battery.

5. A drive system according to claim 1,
wherein the engine is connected to the driven component, and
wherein the efficiency of the engine is an efficiency calculated from a total value of power for driving the driven component and a load of the generator.

6. A. drive, system according to claim 2,
wherein the engine is connected to the driven component, and
wherein the efficiency of the engine is an efficiency calculated from a total value of power for driving the driven component and a load of the generator.

7. The drive system according to claim 1, wherein, when the battery and the power generation device are connected in series, and a voltage of the battery decreases, the drive controller increases a voltage of the power generation device.

8. The drive system according to claim 2, wherein, when the battery and the power generation device are connected in series, and a voltage of the battery decreases, the drive controller increases a voltage of the power generation device.

9. The drive system according to claim 3, wherein, when the battery and the power generation device are connected in series, and a voltage of the battery decreases, the drive controller increases a voltage of the power generation device.

10. The drive system according to claim 4, wherein, when the battery and the power generation device are connected in series, and a voltage of the battery decreases, the drive controller increases a voltage of the power generation device.

11. The drive system according to claim 5, wherein, when the battery and the power generation device are connected in series, and a voltage of the battery decreases, the drive controller increases a voltage of the power generation device.

12. The drive system according to claim 6, wherein, when the battery and the power generation device are connected in series, and a voltage of the battery decreases, the drive controller increases a voltage of the power generation device.

13. The drive system according to claim 1, wherein, when the battery and the power generation device are connected in series, the low-voltage side terminal of the drive device is connected to the low-voltage side terminal of the power generation device, and the high-voltage side terminal of the drive device is connected to the high-voltage side terminal of the battery.

14. The drive system according to claim 2, wherein, when the battery and the power generation device are connected in series, the low-voltage side terminal of the drive device is connected to the low-voltage side terminal of the power generation device, and the high-voltage side terminal of the drive device is connected to the high-voltage side terminal of the battery.

15. The drive system according to claim 3, wherein, when the battery and the power generation device are connected in series, the low-voltage side terminal of the drive device is connected to the low-voltage side terminal of the power generation device, and the high-voltage side terminal of the drive device is connected to the high-voltage side terminal of the battery.

16. The drive system according to claim 1,
wherein the generator is a crow-pole rotary electric machine of a field winding type, and
wherein the power generation device further includes a field control device configured to control a field current of the crow-pole rotary electric machine.

17. The drive system according to claim 2,
wherein the generator is a crow-pole rotary electric machine of a field winding type, and
wherein the power generation device further includes a field control device configured to control a field current of the crow-pole rotary electric machine.

18. The drive system according to claim 3,
wherein the generator is a crow-pole rotary electric machine of a field winding type, and
wherein the power generation device further includes a field control device configured to control a field current of the crow-pole rotary electric machine.

19. A drive control method for a drive system,
the drive system comprising:
a battery:
a power generation device which includes an engine, a generator mounted to a shaft of the engine and configured to convert power of the engine into electric power, and an inverter connected to the generator and configured to mutually convert direct-current power and alternate-current power; and
a drive device which includes a motor configured to drive a driven component, the drive control method comprising:
connecting, during a parallel connection, respective high-voltage side terminals of the power generation device and the battery to a high-voltage side terminal of the drive device, and respective low-voltage side terminals of the power generation device and the battery to a low-voltage side terminal of the drive device,
connecting, during a series connection, the high-voltage side terminal of any one of the power generation device and the battery to the high-voltage side terminal of the drive device, and the low-voltage side terminal of another one of the power generation device and the battery to the low-voltage side terminal of the drive device, and connecting terminals of the power generation device and the battery, which are not connected to the drive device, to each other, and performing a control of switching the series connection and the parallel connection of the battery and the power generation device between both ends of the drive device, wherein, when the battery and the power generation device are connected in parallel, with use of an efficiency map, which is obtained by multiplying a revolution speed of the generator and a torque of the generator by an efficiency of the engine, an efficiency of the generator, and an efficiency of the inverter and setting in advance a total efficiency corrected by a voltage of the battery, a revolution speed of the engine corresponding to the revolution speed of the generator is changed in accordance with a revolution speed and a torque required for the motor and a voltage of the battery so that the total efficiency is maximized on an equal output line of an output required for the motor.

* * * * *